UNITED STATES PATENT OFFICE.

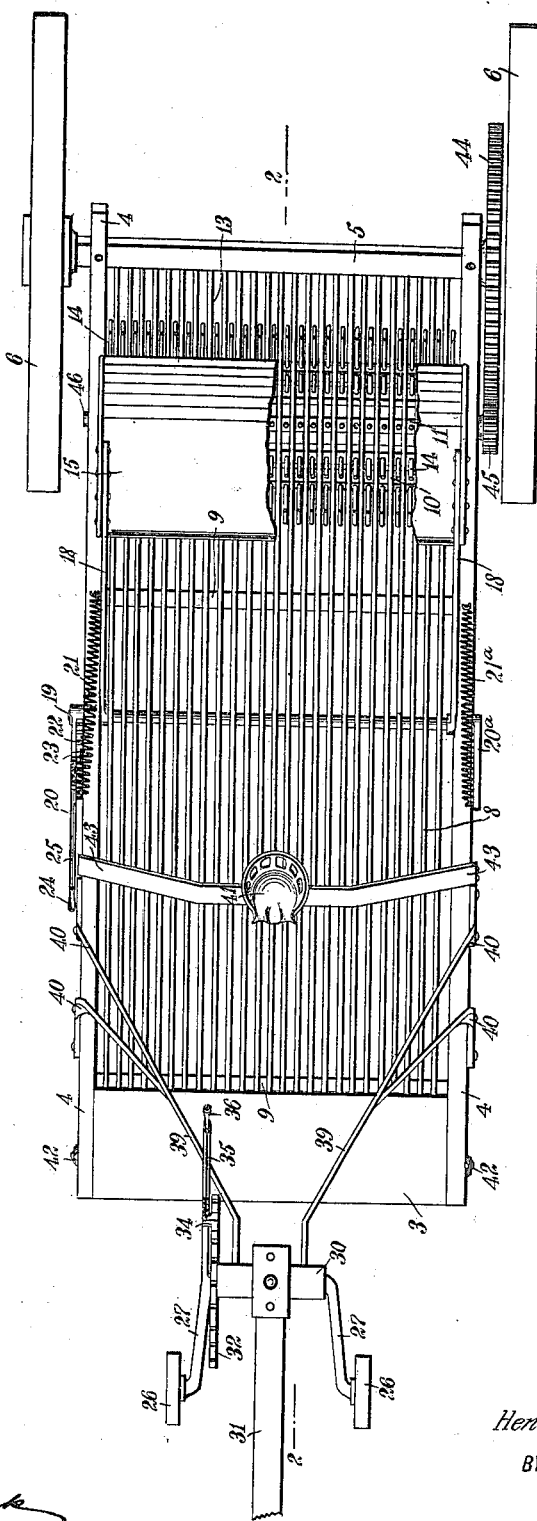

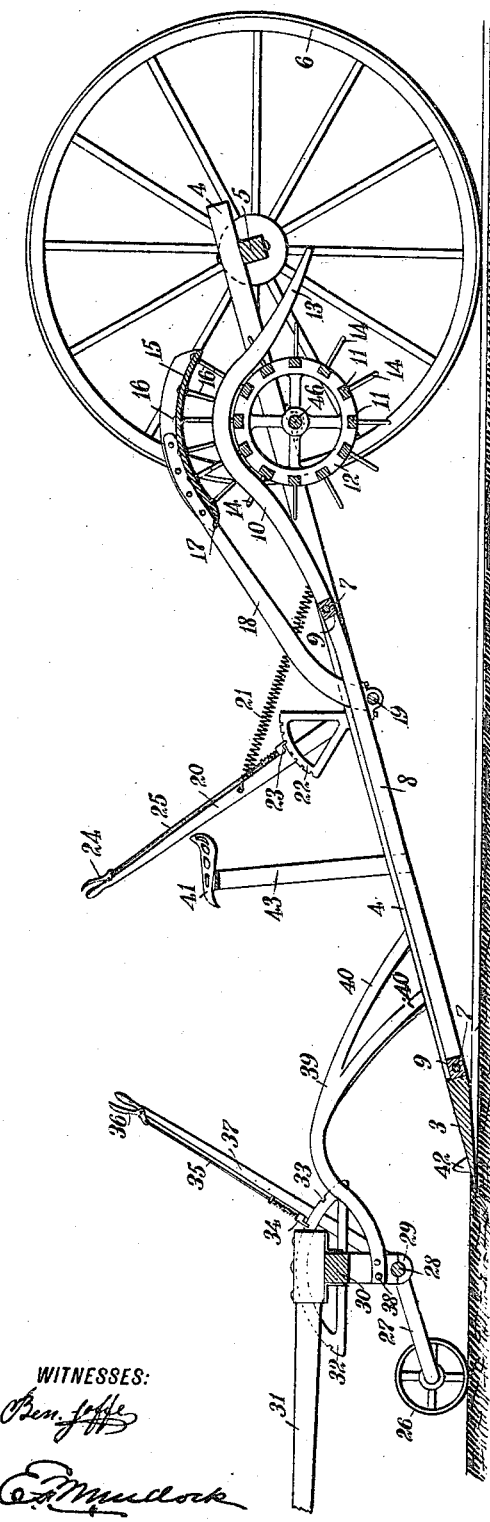

HENRY MELVIN JOHNSON, OF NOME, NORTH DAKOTA.

WEED-ERADICATOR.

964,266.     Specification of Letters Patent.     Patented July 12, 1910.

Application filed February 26, 1910. Serial No. 546,185.

*To all whom it may concern:*

Be it known that I, HENRY MELVIN JOHNSON, a citizen of the United States, and a resident of Nome, in the county of Barnes and State of North Dakota, have invented a new and Improved Weed-Eradicator, of which the following is a full, clear, and exact description.

Among the principal objects which the present invention has in view are: to provide a device for removing the top soil with its growth of weeds to eliminate the weeds therefrom; to provide a device for mechanically separating weeds and attached earth and for scattering the weeds to be destroyed by becoming dried; to provide means for tearing and otherwise bruising the growth of weeds; and to provide means for regulating the depth of the top soil to be treated.

One embodiment of the present invention is disclosed in the structure illustrated in the accompanying drawings, in which like characters of reference denote corresponding parts in both views, and in which—

Figure 1 is a plan view of a machine constructed and arranged in accordance with the present invention; and Fig. 2 is a longitudinal vertical section taken on the line 2—2 in Fig. 1.

The machine illustrated in the accompanying drawings, and herein described, is particularly designed for the removal of the class of weeds of which quack grass and running clover are examples, the peculiarity of the said weeds being that they are attached to the ground by a series of roots, and the life thereof is sustained thereby in sections. When subjected to plowing, or the usual forms of harrowing, these forms of weeds are seldom entirely eradicated. A section may be severed or killed, but a remaining section will thrive and continue to put forth new roots and spreading sections. As a rule, these forms of weeds are not deep rooted, but run over and cover areas of ground.

It is the object of the present invention to elevate at one operation the area of ground covered by the said weeds, and while elevated, to separate the earth from the growing weeds.

For the above stated purpose a laterally extended flat blade share 3 is fixedly mounted in the ends of side beams 4. The side beams 4 are pivotally mounted on an axle 5, having mounted thereon carrying wheels 6, 6. The side beams 4 are laterally braced by tie rods 7, 7, which are extended between the said beams and through steel bars 8, 8, which form an elongated mold board to receive and guide the top soil when severed from the earth by the share 3. Between the bars 8, 8, and threaded over the rods 7, 7, are blocks 9, 9, which maintain the separated position of the bars 8, 8 when the tie rods 7, 7 are drawn in clamp relation to the said side beams 4 and interposed bars 8. The bars 8 are, at the upper end, bent upward at 10 to extend above the cross bars 11, 11 of a beater 12. The bars 8, 8 are extended beyond the rear of the beater 12 to form a tail piece 13, from which the separated weeds, rubbish and grass are delivered. The beater 12 embodies two end wheels or drum heads connected by a plurality of bars 11, 11 disposed in open order, as shown in Fig. 2 of the drawings. The bars 11, 11 are equipped with a series of fingers or beaters 14, 14, arranged in successive order to pass between the bars 8, 8. The beaters 14, 14 are elongated sufficiently to pass above the upper surface of the bars 8 in the bent portion 10 thereof. In its operation the beater 12 is rotated rapidly and strikes upon the clods or sod of the top soil, and the grass or weeds carried thereby, to macerate the weeds and grass and separate the same from any adhering soil.

In the above described operation of the beater it is assisted by a hood 15 and the teeth 16, 16 depending from the under side thereof. The teeth 16, 16 are disposed to rest on the upper surface of the rods 8, 8 to support the hood 15. The beaters 14, 14, therefore, pass upward between the teeth 16. The hood 15 is provided at the forward end with an upturned section 17, which guides beneath the said hood any clods or bunches of material delivered from the mold board formed by the bars 8, 8. The hood 15 is fixedly mounted on side beams 18, which are fixedly mounted on a shaft 19. The shaft 19 is suspended in bearings below the mold board formed by the bars 8, and is provided at one end with a hand lever 20, whereby the shaft 19 is rocked to lift the hood 15 from engagement with the bars 8, 8. The lever 20 forms an attachment for a spiral spring 21, which draws the said lever and arms 18 connected therewith to force the said hood, and the teeth 16 connected therewith, against the bars 8, 8. This construction forms a yielding connection for the hood 15 and the teeth provided therefor. A quadrant 22 is fixedly mounted on one of the side arms 4 to receive a detent head 23 which is connected with a hand grip lever 24. By means of the lever 24, a connecting rod 25, and the detent 23, the shaft 19 may be rocked to lift the hood 15 and locked in such position. The shaft 19 also carries an equalizing arm 20$^a$, connected by a spring 21$^a$ to the other side arm 4.

The forward end of the machine is carried on small bracketed carrying wheels 26, 26. The wheels 26, 26 are pivotally mounted in axles extended laterally from bracket arms 27. The bracket arms 27 are fixedly attached to a shaft 28, which is mounted in bearings 29 in a frame 30. It is to the frame 30 that the tongue 31 is connected to receive the swingletrees and team hitching devices. Fixedly mounted on the frame 30 is also a quadrant 32, in the teeth 33 whereof a detent head 34 is adjustably seated. The head 34 is mounted on the end of a rod 35 connected to a hand gripping lever 36. The detent 34, the rod 35 and lever 36 are suitably mounted upon an adjusting lever 37, which is fixedly attached to the shaft 28, the office of which lever is to rock the shaft 28 to raise and lower the wheels 26, 26 relatively to the frame 30. To the frame 30 there is fixedly connected by rivets 38, a spider bracket frame 39, the ends 40, 40 whereof are fixedly attached to the side beams 4, 4.

By means of the above described construction, when the lever 37 is moved to lower the wheels 26, the frame 30 and the share 3 are raised from the ground on which the wheels 26 are riding. It is obvious that by adjusting the lever 37 the depth of operation of the share 3 may be controlled by the driver seated on the seat 41. Also, the lever 37 may be manipulated to raise the share 3 and frame carried thereby over an obstruction, such as a low lying stump or boulder.

To assist in the operation of the share 3, and to clear the furrow formed thereby, I have provided small upturned colters 42, 42, the function of which is to sever the sod being upturned from the adjacent sod, and thereby prevent the same being dragged laterally from the share 3 and the mold board formed by the bars 8, 8. The seat 41 is mounted on a spring frame 43, the ends of which are secured to the side beams 4, 4, as shown in Fig. 1 of the drawings.

The operation of the machine is as follows: In passing to the point of operation the lever 37 is adjusted to raise the share 3 from contact with the ground. When the machine has arrived at the point of operation the driver releases the lever 37 and rotates the shaft 28 to lower the frame 30 until the share 3 is placed in cutting position with reference to the top soil of the earth. The thin layer of top soil is shaved from the earth, being severed laterally therefrom by the colters 42, 42, and forced over the inclined share 3 of the mold board formed by the bars 8, 8. In passing up the bars 8, 8 the natural vibration of the machine breaks the finer soil from the clumps or partially adhering grass or weeds, and sifts or drops the soil between the bars 8, 8. The weeds or grass remain on the surface of the bars 8, 8, and are gradually forced by the increment of grass or earth upward over the bars 8, 8 and the inclined portion 10 thereof, under the hood 15, between the teeth 16 thereof and the beaters 14. As the material passes under the hood 15, it is obvious that the operation of the beaters 14 tears the material to pulverize the clods, if any there be, and to macerate the grass or weeds prior to delivering them over the tail piece 13, from whence they are scattered over the ground.

The beater 12 is rotated by means of gears 44 and 45. The gear 44 is loosely mounted on the axle 5, while the gear 45 is fixedly attached to an axle 46 of the beater 12. By means of this gearing the beater 12 is rotated, but is rotated in a direction opposite that followed by the wheels 6, 6. The above mentioned direction of rotation of the beater 12 operates to deliver the weeds, straw and rubbish backward over the tail piece 13. The gear 44 is moved with the axle 5 only when controlled to do so by any suitable form of clutch slidably but non-rotatively mounted on the said axle and manually controlled to engage the said gears 44.

Having thus described my invention, what I claim as new and desire to secure by Letters Patent is:—

1. A weed eradicator, comprising a horizontally disposed cutting blade adapted to sever and lift the top soil thereon; a beater disposed at the rear of said blade to pulverize the said soil; a plurality of separated parallel longitudinally disposed bars arranged to receive the earth from said blade and to deliver the same over said beater, the arms of said beater extending between the said bars; and a plurality of depending teeth mounted in a yielding frame above said beater to retard the passage of material thereover.

2. A weed eradicator, comprising a horizontally disposed cutting blade adapted to sever and lift the top soil thereon; a beater disposed at the rear of said blade to pulverize the said soil; a plurality of separated parallel longitudinally disposed bars arranged to receive the earth from said blade and to deliver the same over said beater, the arms of said beater extending between the said bars; a hood having a plurality of depending teeth disposed above said beater, said teeth being mounted in staggered relation with the arms of said beater; a spring for maintaining the depressed position of said hood; and means for lifting the said hood from said beater operable from the driver's seat.

3. A weed eradicator comprising a horizontally disposed cutting blade adapted to sever and lift the top soil thereon; a beater disposed at the rear of said blade, having outwardly extending arms; a plurality of separated parallel bars to convey the earth from said blade over said beater, the arms of said beater extending between said bars; and a plurality of teeth depending above said beater to retard the passage of material thereover.

In testimony whereof I have signed my name to this specification in the presence of two subscribing witnesses.

HENRY MELVIN JOHNSON.

Witnesses:
 HENRY A. WILBERG,
 L. HOGSTAD.